Aug. 13, 1963 — A. L. LEE ETAL — 3,100,647
FLUID SEAL
Filed Nov. 17, 1960

INVENTORS
ARTHUR L. LEE
BY ARTHUR B. COVAL

THEIR ATTORNEY

United States Patent Office 3,100,647
Patented Aug. 13, 1963

3,100,647
FLUID SEAL
Arthur L. Lee and Arthur B. Coval, Columbus, Ohio, assignors to Consolidation Coal Company, Pittsburgh, Pa., a corporation of Pennsylvania
Filed Nov. 17, 1960, Ser. No. 70,021
6 Claims. (Cl. 277—59)

The present invention relates to fluid seals and more particularly to pressure actuated, self lubricating, running seal to inhibit leakage between two relatively rotatable members.

Running fluid seals present problems of extreme wear and disintegration at high fluid pressures and high rotating speeds. By "running seal" is meant a seal between two relatively rotatable members as opposed to a static seal where the two bodies between which a seal is created have negligible movement relative to each other. It is well recognized in the seal art that static seals do not present the problems of extreme wear under high pressure that are inherent in running seals. Static seals may be utilized at extremely high pressures since the very small magnitude of movement and the low velocity of the relative movement between parts being sealed do not present problems of wear or disintegration to static seals. Running seals, on the other hand, have been hitherto limited to relatively low pressures and operating speeds for prolonged running seal life.

The seal of the present invention may be utilized to seal high pressure fluid and is designed to be utilized at high shaft rotating speeds. The seal of the present invention is both pressure actuated and self lubricating. This invention provides a novel, self lubricating seal ring which serves to alleviate the high frictional resistance which has caused failure of earlier high pressure fluid seals.

The present invention may be utilized as a shaft seal to provide a running seal between a rotating shaft and a fixed housing member. A shaft seal should be radially compact, have low friction properties, and, at the same time, be easily assembled and installed on the shaft. The present invention provides shaft seals which require very little effort for installation of the seals.

The fluid seals of the present invention have, as their primary element, a modified metal piston ring which has lubricating passages to make it self lubricating. The modified piston ring has a planar sealing surface which remains in sliding sealing contact with a corresponding planar surface on a rotating shaft. A controlled amount of fluid leakage occurs between the seal ring planar sealing surface and the shaft planar sealing surface. In the present invention, this small amount of controlled fluid leakage is utilized to efficiently lubricate the sliding sealing surfaces of the seal ring and the shaft so that a minimum of wear and frictional resistance occurs in the elements of the seal.

To facilitate efficient lubrication of the seal ring, small fluid passages are formed axially through the ring from a fluid contacting surface extending parallel to the planar sealing surface to the planar sealing surface itself. In addition to the axially extending fluid passages, small radial recesses are formed in the fluid contacting surface of the ring. These radial recesses each extend from one of the axial fluid passages radially outwardly to the cylindrical external surface of the seal ring. These radial recesses greatly affect the lubricating properties of the seal ring.

Seal rings of the type of the present invention which have axially extending passages from a fluid contacting surface to the planar sealing surface of the ring are known in the seal art. These seal rings have been utilized to seal high pressure fluids although they do not have an effective sealing life when utilized to seal high pressure fluids at high shaft rotating speeds. In the seal ring of the present invention it has been found that the addition of radial recesses in the fluid contacting surface greatly increase the lubricating properties of the seal ring and greatly increase seal ring life. For example, it has been found that when the radial recesses are added to a seal ring having axial passages therethrough, the frictional resistance of the ring to rotation is reduced by 25 percent. Thus, for the same fluid pressure being sealed and for a ring of the same size and formed of the same material, the addition of recesses in the fluid contacting surface of the ring greatly increases seal life. Likewise, the reduced frictional resistance resulting when the radial recesses are added to the seal ring permits higher pressures to be sealed by the seal of the present invention without materially reducing seal life. With the present invention, a simple, inexpensive, seal ring may be incorporated into a simple sealing arrangement to provide effective high pressure sealing.

In the following detailed description, the seal of the present invention will be described as a shaft seal adapted to permit fluid communication between a fluid passage within a fixed housing member and a fluid passage within a rotating shaft member so that fluid under pressure may be continually passed from one passage to the other without substantial leakage around the outer portion of the shaft. While the housing will be referred to as a fixed housing and the shaft will be referred to as a rotating shaft throughout this specification, it is within the scope of the present invention to have a rotatable outer housing member and a fixed shaft member.

With the foregoing considerations in mind, it is a primary object of the present invention to provide an improved running fluid seal.

Another object of this invention is to provide a running seal which has long life under high pressure and high speed conditions.

Another object of this invention is to provide a seal incorporating a seal ring that has lubricating passages adapted to conduct fluid to the sealing surface of the ring from the cylindrical external surface of the ring.

Another object of this invention is to provide a running seal that is radially compact and easily assembled and installed on a shaft.

Another object of this invention is to provide a seal which is simple and easy to manufacture and assemble.

These and other objects achieved by this invention will become apparent as this description proceeds in conjunction with the accompanying drawings.

Figure 1:
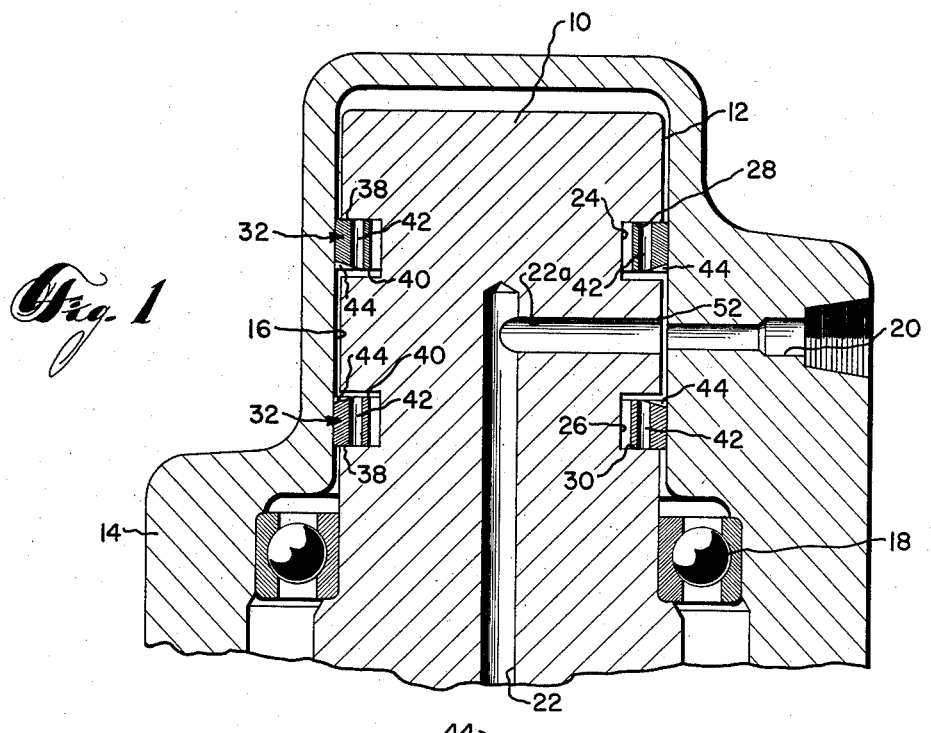
FIGURE 1 is a sectional view of a high pressure running seal built in accordance with the principles of the present invention.

Referring to the drawings, there is shown a shaft 10 having a cylindrical external surface 12. Surrounding the shaft 10 is a housing member 14 having a cylindrical internal surface 16. The cylindrical external surface 12 of shaft 10 is maintained in coaxial relation to the internal surface 16 of housing 14 by the bearing 18. Bearing 18 permits the shaft 10 to freely rotate relative to housing 14.

The housing 14 has a fluid passage 20 which communicates with the cylindrical internal surface 16 of the housing. A fluid passage 22 is formed within the shaft 10. The passage 22 has a radially extending portion 22a which communicates with the cylindrical external surface of the shaft 10. When the shaft 10 is in position within the housing 14, the passage 20 of housing 14 and the radially extending portion 22a of passage 22 within shaft 10 are axially aligned with each other.

Formed within the cylindrical external surface 12 of shaft 10, one on either side of the radially extending portion 22a of the passage 22, are annular recesses 24 and 26. The annular recess 24 has a smooth, planar sealing surface 28 formed on the wall furthermost from the passage 22a. Likewise, the annular recess 26 has a smooth, planar sealing surface 30 formed on the furthermost end wall from passage 22a. Both planar sealing surfaces 28 and 30 extend radially in planes which are normal to the axis of the cylindrical surface 12 of shaft 10.

Figure 2:
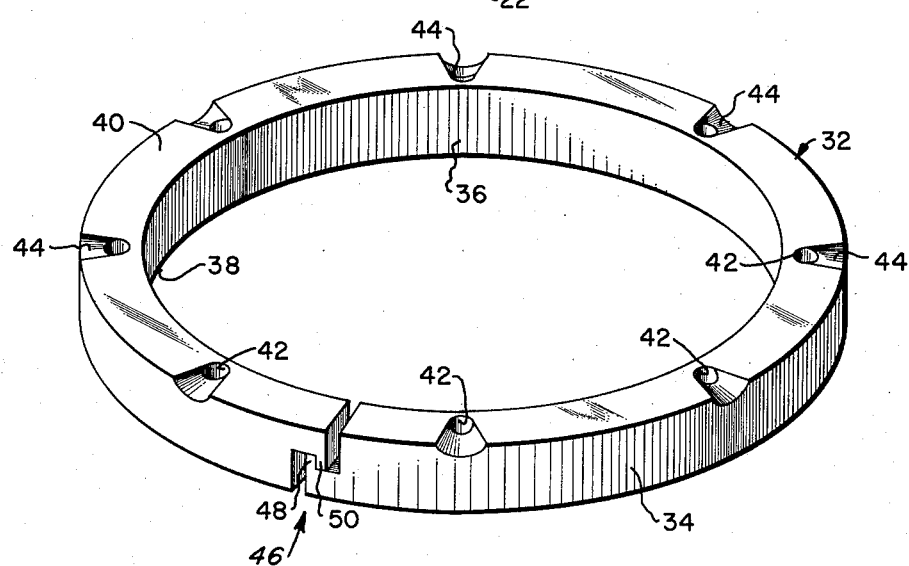
FIGURE 2 is a perspective view of the novel seal ring utilized in the seal of FIGURE 1.

Freely received within the shaft annular recesses 24 and 26 are seal rings 32. Seal rings 32 are identical to each other and their construction may best be seen in FIGURE 2. As seen in FIGURE 2, each seal ring 32 has a cylindrical external surface 34 and a cylindrical internal surface 36. Extending radially between the external surface 34 and internal surface 36 is planar sealing surface 38 which lies in a plane normal to the axis of the coaxial cylindrical surfaces 34 and 36. A planar fluid engaging surface 40 is formed on the ring 32 in parallel spaced relation to the planar sealing surface 38.

A plurality of fluid passages 42 are formed through the seal ring 32 from the fluid contacting surface 40 to the planar sealing surface 38. The fluid passages 42 are preferably equally spaced about the periphery of the seal ring, however, it is within the scope of the present invention to have them at unequal distances from each other. Likewise, eight recesses are shown in the embodiment of the seal ring of FIGURE 2. It is within the scope of this invention to provide a greater or fewer number of fluid passages 42 depending upon the pressure and speed conditions under which the ring will be used.

The seal rings 32 of the present invention are preferably formed from cast iron. Other metals or equivalent material may be utilized in forming the ring. Excellent results have been obtained in operation with seals formed of cast iron rings having eight equally spaced fluid passages as shown in FIGURE 2.

Formed in the fluid contacting surface 40 of the seal ring 32 are a plurality of radial recesses 44. One radial recess 44 is formed adjacent each of the fluid passages 42 and extends radially outwardly from the fluid passage 42 to the cylindrical external surface 34 of the seal ring. The fluid passages 42 are preferably formed as cylindrical passages with their axes parallel to the axes of the cylindrical internal and external surfaces of the sealing ring 32. The recesses 44 are formed in the fluid contacting surface 40 to a depth approximately equal to the diameter of the cylindrical fluid passages 42.

The seal ring 32 is resilient due to the inherent resiliency of the material from which it is formed. Ring 32 is broken by a radial break 46. An axially extending protrusion 48 is formed on one side of the radial break 46 while another axially extending protrusion 50 is formed on the other side of the radial break 46. These protrusions 48 and 50 are positioned to interlock, one over the other, so that the maximum circumference of the ring is limited by the abutment of protrusions 48 and 50 with each other as shown in FIGURE 2. At the same time, the minimum circumference of the ring is limited by abutment of the walls of the ring at the radial break 46. Due to the inherent resilience of the ring, the ring 32 tends to expand outwardly toward its maximum circumference so that when the ring is not installed in position within the seal assembly, the protrusions 48 and 50 abut each other and the ring remains at maximum circumference as shown in FIGURE 2. In assembly of the seal, the seal rings 32 are positioned within their respective annular recesses 24 and 26. Each ring 32 is placed with the planar sealing surface 38 of the ring facing toward the respective planar sealing surface 28 of recess 24 or toward the planar sealing surface 30 of recess 26. The recesses 24 and 26 and rings 32 are of such size that the ring may move axially within its respective recess. The rings 32 are positioned within their respective recesses 24 and 26 prior to the placing of the shaft 10 in position within the housing 14.

Once the rings are in position on the shaft 10, the shaft 10 and the rings 32 are placed within the cylindrical internal surface 16 of housing 14. The cylindrical internal surface 16 of housing 14 has a circumference less than the maximum circumference of the seal ring 32 but greater than the minimum circumference of seal ring 32. Accordingly, when the rings are inserted within the cylindrical internal surface 16, the rings 32 expand outwardly against the cylindrical surface 16 of housing 14 so that there is a tight, frictional, nonrotating, and sealing relation between the external cylindrical surface 34 of each ring 32 and the cylindrical internal surface 16 of the housing 14.

As shown in FIGURE 1, there is an exaggerated clearance between the external cylindrical surface 12 of shaft 10 and the internal cylindrical surface 16 of housing 14. In actual practice, there is but a slight clearance between the surface 12 and surface 16 so that the shaft 10 may rotate freely within housing 14.

Once in position within the housing 14, the shaft 10 has its radially extending passage 22a in axial alignment with passage 20 of housing 14. The seal rings 32 define the axial limits of an annular chamber 52 between housing 14 and shaft 10 into which high pressure fluid may be conducted so that it may pass between passage 20 and passage 22a. If for example, high pressure fluid is conducted into passage 20 for ultimate flow through passage 22, high pressure fluid fills the annular chamber 52 between the seal rings 32. This high pressure fluid forces the seal rings 32 into sliding sealing relation with the planar sealing surfaces 28 and 30 formed within annular recesses 24 and 26 respectively. Thus as the shaft 10 rotates, the housing 14 and the seal rings 32 remain fixed while the shaft 10 rotates. Accordingly, the fluid seal is between the ring planar sealing surface 38 and the shaft planar sealing surface 28 at recess 24 and between the ring sealing surface 38 and the shaft planar sealing surface 30 at recess 26.

In all piston ring seals of the general type of the present invention, small amounts of leakage occur between the sliding sealing surfaces of the seal. The small amounts of leakage provide lubricating fluid for the sealing surfaces of the seal to prevent premature wear of the seal and to reduce the power lost during rotation of the seal. To enhance surface lubrication of the seal of the present invention, the axial passages 42 are formed in the ring which permits fluid communication from the annular chamber between the rings to the sealing surface of the ring. In prior seal rings having such axial passages formed therein, little or no improvement over conventional seal rings bearing no passages could be noted. While there was some improvement in reducing frictional resistance of the rings when these passages were formed, on the whole, the rings having only axial passages were not sufficiently improved to have long seal life and reduced frictional resistance.

It has now been discovered that when radial passages 44 are formed in the fluid contacting surface 40 of the seal to extend radially outwardly from each of the axially extending fluid passages 42 to the cylindrical external surface of the ring, highly increased seal efficiency results. The very simple addition of radial recesses on the fluid contacting surface of the ring produces surprisingly improved results in the operation of the seal both as to the long life of the seal and as to the reduced power requirements to operate the seal.

Seals of the present invention having rings with the radial recesses 44 formed therein were tested under the exact same operating conditions as rings identical in every respect to the rings of the present invention except that the radial passages 44 were not formed therein. The results of these tests demonstrate that the rings of the present invention produce superior seals. The seals were tested at various fluid pressures up to 500 pounds per square inch. At each fluid pressure tested, the frictional resistance to rotation of the seals of the present invention was approximately 25 percent less than the frictional resistance to turning of seals identical in every respect to those of the present invention except that the conventional seals had no recesses 44 formed therein.

The seals of the present invention have been operated continuously at high pressures for long periods of time. The comparison of the seals of the present invention with the radial recesses 44 formed therein with seals not having radial recesses 44 tend to show generally superior overall results achieved by the seal of the present invention.

According to the provisions of the patent statutes, we have explained the principle, preferred construction and mode of operation of our invention and have illustrated and described what we now consider to represent its best embodiment. However, we desire to have it understood that, within the scope of the appended claims, the invention may be practiced otherwise than as specifically illustrated and described.

We claim:

1. A rotary fluid seal for impeding the passage of fluid between first and second relatively rotatable members, said first member having a cylindrical external surface and being positioned coaxially within a cylindrical internal surface formed in said second member, said seal comprising an annular recess formed in said first member cylindrical external surface, said annular recess having a planar end wall, a seal ring having a cylindrical external surface, an internal surface, a planar sealing surface extending radially between said ring external and internal surfaces and a planar fluid contacting surface, said seal ring being positioned within said first member annular recess with said ring cylindrical external surface in frictional, nonrotating and sealing engagement with said second member cylindrical internal surface, said ring sealing surface being in sliding sealing relation with said second member annular recess planar end wall, and means including radial recesses in said planar fluid contacting surface to admit fluid for lubrication to said ring sealing surface from said ring cylindrical external surface.

2. A rotary fluid seal for impeding the passage of fluid between first and second relatively rotatable members, said first member having a cylindrical external surface and being positioned coaxially within a cylindrical internal surface formed in said second member, said seal comprising an annular recess formed in said first member cylindrical external surface, said annular recess having a planar sealing surface extending radially inwardly from said first member cylindrical external surface, a seal ring including a cylindrical external surface, a cylindrical internal surface coaxial with said ring cylindrical external surface, a planar sealing surface extending radially between said ring internal and external cylindrical surfaces, and a planar fluid contacting surface extending radially between said ring cylindrical internal and external surfaces in axially spaced relation from said ring planar sealing surface, a plurality of fluid passages extending axially through said ring from said fluid contacting surface to said ring planar sealing surface, a plurality of radial recesses formed adjacent the circle of intersection of said planar fluid contacting surface and said ring cylindrical external surface, said radial recesses each connecting said ring cylindrical external surface with one of said ring fluid passages, said seal ring being positioned within said first member annular recess with said ring cylindrical external surface in frictional, nonrotating and sealing engagement with said second member cylindrical internal surface, said ring being urged axially by fluid pressure between said first and second members so that said ring planar sealing surface is in sliding sealing relation with said first member recess sealing surface, said ring fluid passages and said ring radial recesses constructed and arranged to distribute fluid for lubrication over said ring planar sealing surface from said ring planar fluid contacting surface and said ring cylindrical external surface.

3. A rotary fluid seal for impeding the passage of fluid between first and second relatively rotatable members to conduct fluid under pressure from a passage formed in said first member to a passage formed in said second member without substantial loss of fluid pressure therebetween, said first member having a cylindrical external surface with said first member passage communicating therewith, said first member being positioned coaxially within a cylindrical internal surface formed in said second member, said second member passage communicating with said second member cylindrical surface and positioned in axial alignment with said first member passage when said first member is in place within said second member, said seal comprising first and second annular recesses formed in said first member cylindrical external surface in axially spaced relation on each side of said first member passage, said first and second annular recesses each having a planar sealing surface extending radially inwardly from said first member cylindrical external surface, said planar sealing surfaces positioned axially outwardly from said first member passage, first and second seal rings each including a cylindrical external surface, a cylindrical internal surface coaxial with said ring cylindrical external surface, a planar sealing surface extending radially between said ring internal and external cylindrical surfaces, and a planar fluid contacting surface extending radially between said ring cylindrical internal and external surfaces in axially spaced relation from said ring planar sealing surface, a plurality of fluid passages extending axially through said ring from said fluid contacting surface to said ring planar sealing surface, a plurality of radial recesses formed adjacent the circle of intersection of said planar fluid contacting surface and said ring cylindrical external surface, said radial recesses each connecting said ring cylindrical external surface with one of said ring fluid passages, said first and second seal rings being positioned within said first member first and second annular recesses respectively with said ring cylindrical external surfaces in frictional, nonrotating and sealing engagement said second member cylindrical internal surface, said first and second rings being urged axially away from each other by fluid pressure between said first and second members so that said first and second seal ring planar sealing surfaces are in sliding sealing relation with said first member first and second recess sealing surfaces respectively, said ring fluid passages and said ring radial recesses constructed and arranged to distribute fluid for lubrication over said first and second ring planar sealing surfaces from said first and second ring planar fluid contacting surfaces and said ring cylindrical external surfaces.

4. A seal ring for use in a fluid seal, said seal ring comprising a cylindrical external surface, a cylindrical internal surface coaxial with said cylindrical external surface, a planar sealing surface extending radially between said internal and external cylindrical surfaces, a planar fluid contacting surface extending in parallel, spaced relation to said planar sealing surface between said internal and external cylindrical surfaces, a plurality of fluid passages formed in said ring and extending axially through said ring from said planar fluid contacting surface to said planar sealing surface, a plurality of radial recesses formed in said fluid contacting surface and extending radially outwardly from at least some of said fluid passages into said cylindrical external surface, said fluid passages and said radial recesses constructed and arranged to distribute fluid for lubrication over said planar sealing surface from said planar fluid contacting surface and said cylindrical external surface.

5. The seal ring of claim 4 wherein said fluid passages and said radial recesses are equally spaced about said sealing ring.

6. The seal ring of claim 4 wherein said fluid passages are formed as cylindrical bores having their axes parallel to the axes of said ring cylindrical internal and external surfaces.

References Cited in the file of this patent

UNITED STATES PATENTS

| | | |
|---|---|---|
| 2,162,218 | Hill | June 13, 1939 |
| 2,265,953 | Mortensen et al. | Dec. 9, 1941 |